United States Patent
Dave' et al.

(10) Patent No.: US 8,180,875 B1
(45) Date of Patent: May 15, 2012

(54) PING-BASED COMMUNICATION SYSTEM (PICS)

(75) Inventors: Nikhil Dave', San Diego, CA (US); Albert K. Legaspl, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 581 days.

(21) Appl. No.: 12/020,750

(22) Filed: Jan. 28, 2008

(51) Int. Cl.
*G06F 15/16* (2006.01)
(52) U.S. Cl. .................. 709/223; 709/230; 709/249
(58) Field of Classification Search .................. 367/118, 367/127; 709/202, 203
See application file for complete search history.

(56) References Cited

U.S. PATENT DOCUMENTS

| | | | | |
|---|---|---|---|---|
| 6,665,611 B1 * | 12/2003 | Oran et al. | ...................... | 701/213 |
| 2002/0024941 A1 * | 2/2002 | Lee et al. | ........................ | 370/331 |
| 2002/0035432 A1 * | 3/2002 | Kubica et al. | ..................... | 702/5 |
| 2002/0138580 A1 * | 9/2002 | Al-Kazily et al. | ............ | 709/206 |
| 2003/0125973 A1 * | 7/2003 | Mathews et al. | ................... | 705/1 |

OTHER PUBLICATIONS

Mills, D.L. "RFC778—DCNET Internet Clock Service". Apr. 18, 1981.*
Mills, D.L. "RFC958—Network Time Protocol (NTP)". Sep. 1985.*
Postel, J. "Internet Control Message Protocol." Published Apr. 1981.*
"ping Command" AIX 6.1, released Nov. 2007.*

* cited by examiner

*Primary Examiner* — Scott Christensen
(74) *Attorney, Agent, or Firm* — Kyle Eppele; J. Eric Anderson

(57) ABSTRACT

A method of synchronizing clocks between local and remote unix-like computers comprising: sending internet control message protocol (ICMP) ping packets between at least two computers in a network; archiving ICMP echo-request and echo-reply packets from the networked computers in an archive file with an ICMP packet capture utility; including information in each echo-request sent from a local computer to a remote computer comprising: (1) the local time stamp of when the last echo-request from the remote computer was received at the local computer, and (2) the local time stamp of when the corresponding echo-reply was sent from the local computer; calculating an approximate clock offset between the networked computers based on the time stamps; and synchronizing the clocks of the networked computers based on the approximate clock offset of the computers.

11 Claims, 3 Drawing Sheets

PING-BASED COMMUNICATION SYSTEM (PICS)

FEDERALLY-SPONSORED RESEARCH AND DEVELOPMENT

This invention (Navy Case No. 97277) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case Number 97277.

BACKGROUND OF THE INVENTION

The Network Time Protocol (NTP) is the standard protocol for computer clock synchronization. However, NTP packets are subject to ordinary network delays encountered by all informational traffic. A need exists for a protocol that can bypass some of the range of delays that NTP packets encounter on a network.

BRIEF DESCRIPTION OF THE DRAWINGS

Throughout the several views, like elements are referenced using like references.

DETAILED DESCRIPTION OF EMBODIMENTS

Figure 1:
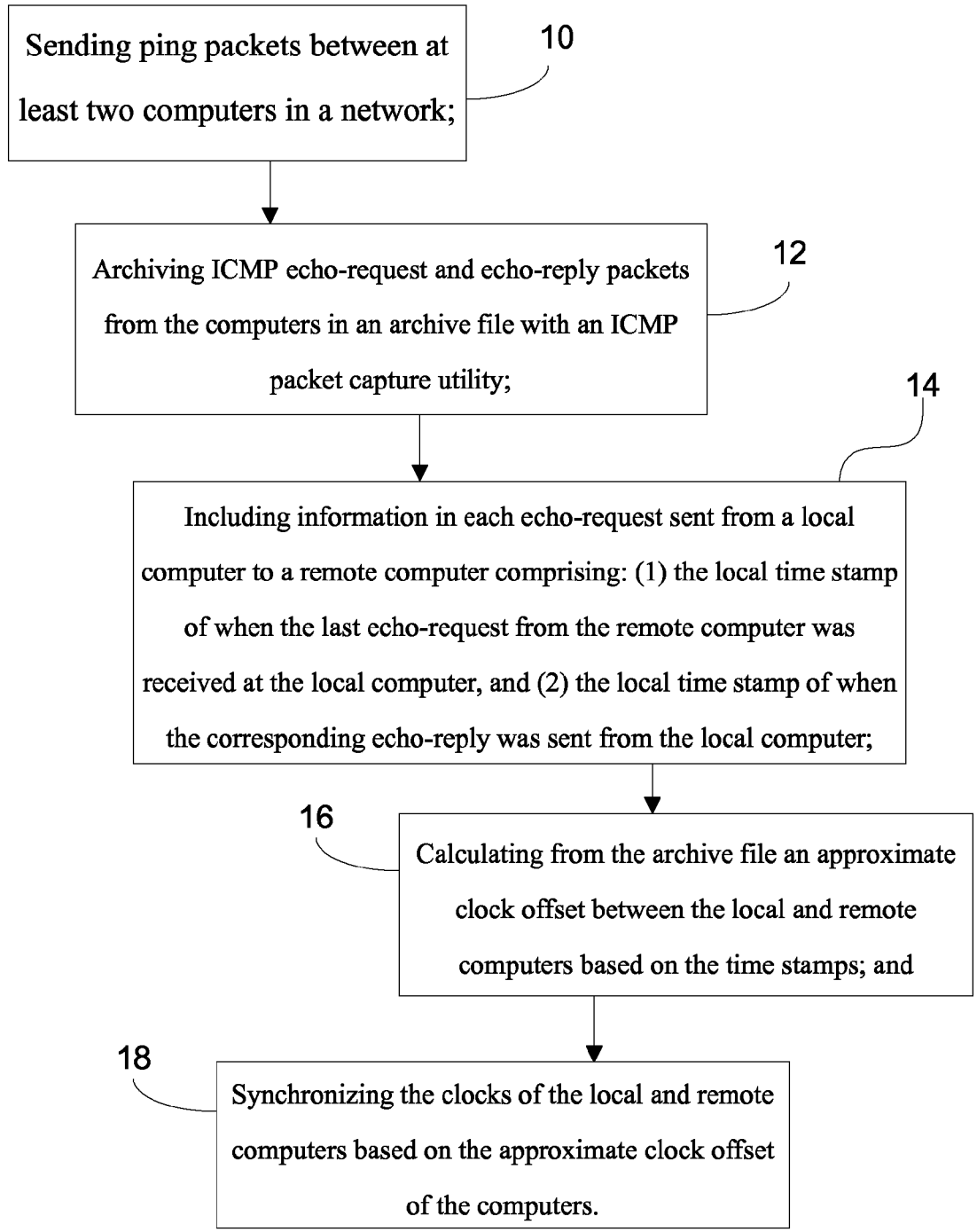
FIG. 1 is a flowchart depicting a method of communicating information between local and remote unix-like computers.

Information may be communicated between local and remote unix-like (e.g. Linux®) computers through the PIng-based Communications System (PICS). PICS utilizes Internet Control Message Protocol (ICMP) packets in unix-like system environments. ICMP packets provide the advantage of being granted top, non-preemptive priority on the internet by all routers—avoiding some of the range of ordinary delays encountered by other informational traffic on an Internet Protocol (IP) network. FIG. 1 is a flowchart of one embodiment of the PICS process, which comprises the following steps: sending ping packets between at least two computers in a network 10; archiving ICMP echo-request and echo-reply packets from the computers in an archive file with an ICMP packet capture utility 12; including information in each echo-request sent from a local computer to a remote computer comprising: (1) the local time stamp of when the last echo-request from the remote computer was received at the local computer, and (2) the local time stamp of when the corresponding echo-reply was sent from the local computer 14; calculating from the archive file an approximate clock offset between the local and remote computers based on the time stamps 16; and synchronizing the clocks of the local and remote computers based on the approximate clock offset of the computers 18.

The PICS method may be used on any computer utilizing a UNIX® operating system or any computer with a unix-like operating system. A unix-like operating system may be any operating system that functions in a manner similar to UNIX® operating systems (e.g. Linux® operating systems), and can be defined as any system that behaves in a manner consistent with the Single UNIX® Specification, as published by The Austin Group and based upon previous standards published by IEEE and The Open Group. A pattern may be added to the pings of step 10, by virtue of the -p[pattern] option under a unix-like system (reference 'man ping' in unix-like systems). The ICMP packet capture utility referenced in FIG. 1, step 12 may be any packet capture utility software that allows a user to intercept and display ICMP packets that are being transmitted or received over a network of computers. A suitable example of an ICMP packet capture utility is tcpdump (reference 'man tcpdump' in unix-like systems). The network may be hard-wired or wireless.

Figure 2:
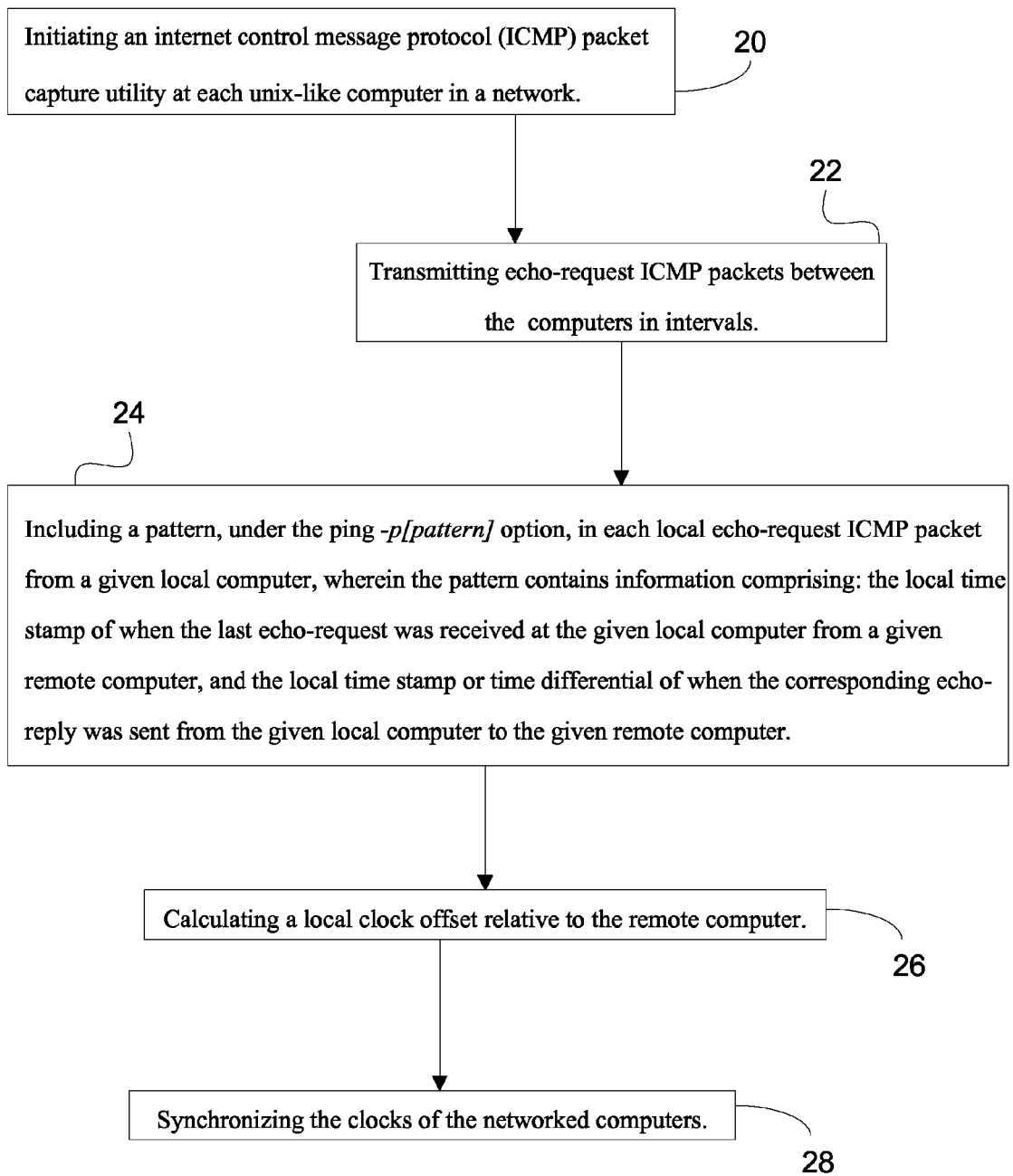
FIG. 2 is a flowchart depicting another embodiment of the method of communicating information between local and remote unix-like computers.

FIG. 2 shows a flowchart of the PICS process for synchronizing clocks between unix-like computers in a network. First, an ICMP packet capture utility is initiated at each unix-like computer in a network (step 20). The ICMP packet capture utility initiated in step 20 may continue to run indefinitely in the background of the computers in the network. Next, the echo-request ICMP packets from the local and remote computers may be transmitted to each other at various random or predetermined intervals (step 22). The echo-request ICMP packet may be of standard length (i.e. 56 bytes), or larger. In step 24, a pattern under the ping -p[pattern] option is included in each local echo-request ICMP packet from a given local computer. The pattern contains information comprising: the local time stamp of when the last echo-request was received at the given local computer from a given remote computer, and the local time stamp or time differential of when the corresponding echo-reply was sent from the given local computer to the given remote computer. In step 26, a local clock offset relative to the remote computer is calculated. Finally, the clocks of the networked computers are synchronized (step 28). The PICS process utilizes the [-p] option in unix-based ping (c.f., man ping under unix-like system command line) where the chosen pattern identifies the local clock time that the last echo request from the remote client computer was received at the local host computer, and additionally when the corresponding echo-response from the local computer was transmitted. The archiving of packet data by a packet capture utility and parsing of the archive file enables the determination of ICMP packets received/sent and the times that such events occurred.

Additional patterns can be sent in the same or separate ICMP packets with the echo-request to communicate other information about a local or remote computer. For example, in one embodiment, a pattern that includes geo-location data such as global positioning system (GPS) coordinates may be sent with an echo-request ICMP packet. In another embodiment, a pattern that includes short situational reports may be sent with an echo-request ICMP packet. Examples of short situational reports may include, but are not limited to, local computer conditions/needs, or readings from sensors operatively coupled to the computer. The PICS process may be tangibly embodied on a computer-readable medium. The computer-readable medium may comprise, for example, computer memory and/or the nonvolatile storage of a computer. Alternatively, the PICS process may be embodied in a computer-readable medium such as the optical data storage disc. The optical storage disc can be any type of signal bearing disc, for example, a CD-ROM, CD-R, CD-RW, WORM, DVD-R, DVD+R, DVD-RW, or DVD+RW. Whether contained in computer hardware or elsewhere, the PICS process may be stored on any of a variety of machine-readable data storage mediums or media, which may include, for example, direct access storage (such as a conventional "hard drive", a RAID array, or a RAMAC), a magnetic data storage diskette (such as a floppy disk), magnetic tape, digital optical tape, RAM, ROM, EPROM, EEPROM, flash memory, magneto-optical storage, paper punch cards, or any other suitable signal-bearing media.

Figure 3:
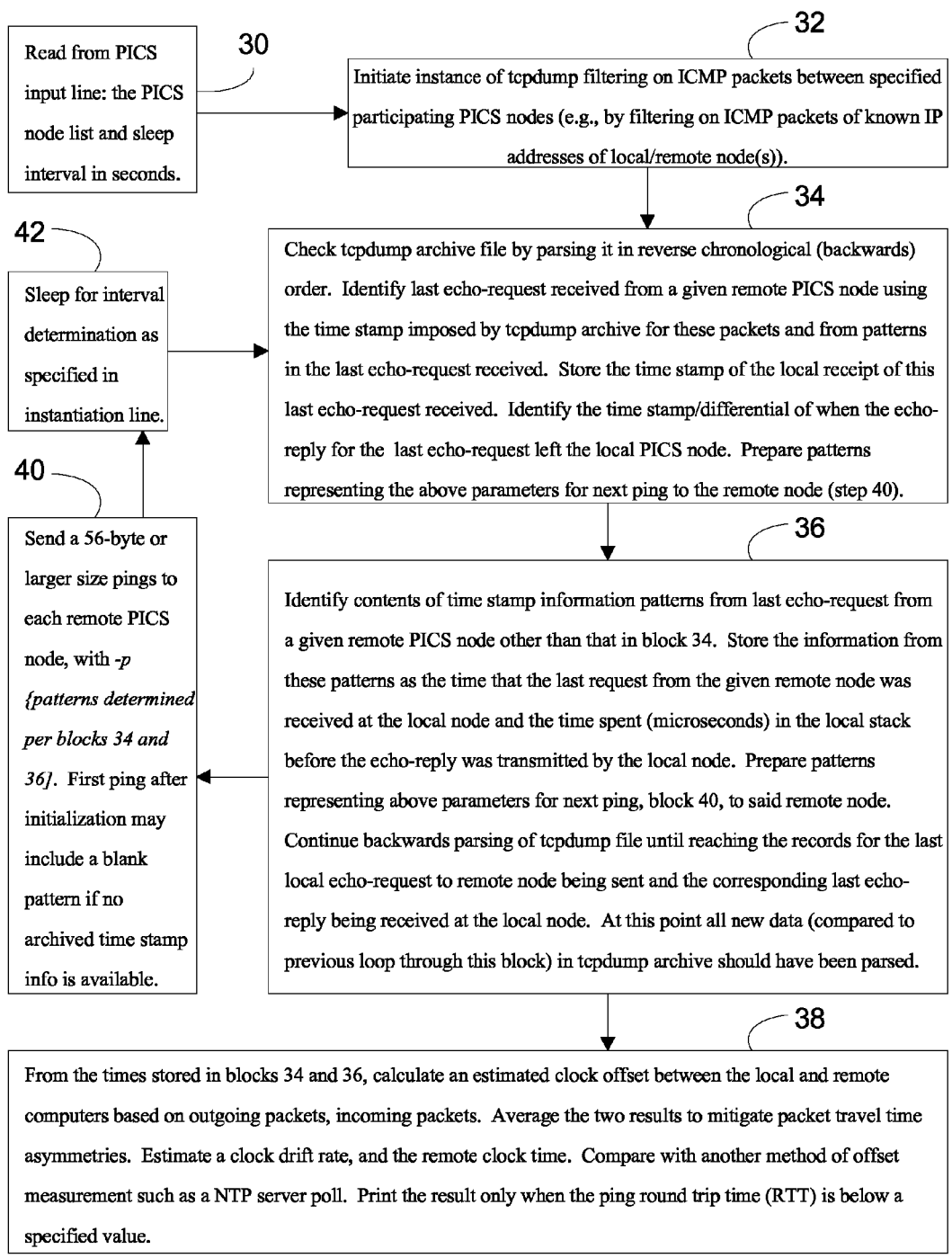
FIG. 3 is a flowchart showing the main events in one embodiment of the method of communicating information between local and remote unix-like computers for a given local and remote unix-like computer node.

FIG. 3 is a flowchart showing the main events in one embodiment of the PICS process for any given unix-like computer node. The first step, shown in FIG. 3 as step 30, involves reading from a PICS input line a PICS node list and a user-inputted sleep interval in seconds. The second step, step 32, initiates an instance of tcpdump, filtering on ICMP packets between PICS nodes specified in the input line. Step 32 may be accomplished by filtering on ICMP packets of known IP addresses of local and remote nodes. Next, step 34, the local computer checks its latest image of the archive tcpdump output file by parsing in reverse chronological (backwards) order, identifying the last echo-request received from a given remote PICS node using the time stamp imposed by tcpdump archive for these packets and from patterns in the last echo-request received. Step 34 also provides for storing the time stamp of the local receipt of the last echo-request received and identifying the time stamp/differential of when the echo-reply for the last echo-request left the local PICS node. Then, patterns are prepared representing the above parameters for the next ping to the remote node (see step 38, described below). Parsing of the archive file in backwards order continues in step 36 by identifying the values of timestamp information patterns from the last echo-request from other remote PICS nodes. The information from the patterns referenced in step 36 are then stored as the time that the last local request was received at the local node and the time spent (microseconds) in the local stack before the corresponding echo-reply was transmitted by the local node. Backwards parsing of the tcpdump output file continues by storing the time that the last local echo-request to the remote node was sent and the last echo-reply was received at the local node. This step (step 36) can be exited after backwards parsing of the tcpdump file locates and stores, for every participating remote node the times that: a) the last local echo-request to the remote node was sent and b) the last remote echo-reply was received at the local node. Step 38 consists of: calculating, from the times stored in steps 34 and 36, the estimated clock offset between the local and remote computers based on outgoing packets, incoming packets, and averaging the two results to mitigate packet travel time asymmetries; estimating a clock drift rate, and a remote clock time; comparing the remote clock time with another method of offset measurement such as a NTP server poll; and printing the result only when the ping round trip time (RTT) is below a specified value (e.g., <1 millisecond). Step 40 consists of sending one or more pings to a remote PICS node, including under the [-p pattern] option the stored times per steps 34 and 36. The pings from step 40 may be 56-bytes or larger. The first ping after initialization may include a blank pattern if no archived time stamp info is available. Finally, step 42 consists of sleeping for an interval specified in the input line. After step 42, the process may then return to step 34.

From the above description of the PICS process, it is manifest that various techniques may be used for implementing the concepts of the process without departing from its scope. The described embodiments are to be considered in all respects as illustrative and not restrictive. It should also be understood that the PICS process is not limited to the particular embodiments described herein, but is capable of many embodiments without departing from the scope of the claims.

The invention claimed is:

1. A method of synchronizing clocks and exchanging information between networked computers which utilize operating systems with the Linux® kernel, the method comprising:
    initiating a first echo request from a second computer to a first computer;
    sending an automatically-generated echo reply corresponding to the first echo request from the first computer to the second computer;
    storing in the second computer the time the first echo request was sent from the second computer to the first computer and the time the corresponding echo reply from the first computer was received at the second computer;
    utilizing a ping -p[pattern] option to include information in a second echo-request sent from the first computer to the second computer, wherein the information comprises:
        (1) the time stamp of when the first echo-request from the second computer was received at the first computer,
        (2) the time stamp of when the corresponding echo-reply to the first echo request was sent from the first computer, and
        (3) GPS coordinates of the first computer;
    after receiving the second echo request, calculating, with the second computer, an approximate clock offset between the first and second computers based on the time the first echo request was sent, the time the first echo reply was received and the information included in the second echo request; and
    synchronizing the clocks of the first and second computers based on the approximate clock offset of the first and second computers.

2. The method of claim 1, wherein the networked computers utilize an ICMP packet capture utility tcpdump to archive the echo requests and echo replies sent between the networked computers.

3. The method of claim 2, further comprising:
    a.) reading from an input line a node list and a user-inputted sleep interval in seconds;
    b.) initiating an instance of tcpdump, filtering on ICMP packets between nodes specified in the node list;
    c.) parsing in reverse chronological order, identifying a last echo-request received from a given remote node;
    d.) storing the time stamp of the local receipt of the last echo-request received and identifying the time stamp of when the echo-reply for the last echo-request left the local node;
    e.) repeating steps c-d until backwards parsing of the tcpdump file locates and stores, for every participating remote node in the network the times that:
        1) the last local echo-request to the remote node was sent, and
        2) the last remote echo-reply was received at the local node;
    f.) calculating, from the times stored in steps c-e, the estimated clock offset between the local and remote computers based on outgoing ICMP packets, incoming ICMP packets;
    g.) estimating a clock drift rate, and a remote clock time;
    h.) comparing the remote clock time with another method of offset measurement such as an NTP server poll; and
    i.) printing the result of step h. only when the ping round trip time is below a specified value.

4. The method of claim 3, wherein the networked computers are connected via a wireless network.

5. The method of claim 1, wherein the information included in the second echo request further comprises a situational report of the condition of the first computer.

6. The method of claim 3, wherein the specified value is less than 1 millisecond.

7. The method of claim 3, wherein the size of each echo request is 56 bytes.

8. The method of claim 3, wherein the size of each echo request is greater than 56 bytes.

9. A non-transitory computer-readable medium, storing program instructions that when executed by a processor perform a method of synchronizing clocks and exchanging information between first and second computers which utilize operating systems with the Linux® kernel, the method comprising:

initiating a first echo request from a second computer to a first computer;

sending an automatically-generated echo reply corresponding to the first echo request from the first computer to the second computer;

storing in the second computer the time the first echo request was sent from the second computer to the first computer and the time the corresponding echo reply from the first computer was received at the second computer;

utilizing a ping -p[pattern] option to include information in a second echo-request sent from the first computer to the second computer, wherein the information comprises:
(1) the time stamp of when the first echo-request from the second computer was received at the first computer,
(2) the time stamp of when the corresponding echo-reply to the first echo request was sent from the first computer, and
(3) GPS coordinates of the first computer;

after receiving the second echo request, calculating, with the second computer, an approximate clock offset between the first and second computers based on the time the first echo request was sent, the time the first echo reply was received and the information included in the second echo request; and synchronizing the clocks of the first and second computers based on the approximate clock offset of the first and second computers.

10. The computer-readable medium of claim 9, wherein the method further comprises:
a.) reading from an input line a node list and a user-inputted sleep interval in seconds;
b.) initiating an instance of tcpdump, filtering on ICMP packets between nodes specified in the node list;
c.) parsing in reverse chronological order, identifying a last echo-request received from a given remote node;
d.) storing the time stamp of the local receipt of the last echo-request received and identifying the time stamp of when the echo-reply for the last echo-request left the local node;
e.) repeating steps c-d until backwards parsing of the tcpdump file locates and stores, for every participating remote node in the network the times that:
1) the last local echo-request to the remote node was sent, and
2) the last remote echo-reply was received at the local node;
f.) calculating, from each of the time stamps stored in steps c-e, the estimated clock offset between the local and remote computers based on outgoing ICMP packets, incoming ICMP packets;
g.) estimating a clock drift rate, and a remote clock time;
h.) comparing the remote clock time with another method of offset measurement, the another method comprising an NTP server poll; and
i.) printing the result of step h. only when the ping round trip time is below a specified value.

11. A method of synchronizing clocks and exchanging information between a first computer and a second computer comprising:
a.) transmitting a first echo-request ICMP packet from the first computer to the second computer;
b.) storing in the first computer a first time stamp $T_1$ representing the time when the first echo-request left the first computer;
c.) receiving the first echo-request at the second computer;
d.) storing in the second computer a second time stamp $T_2$ representing the time when the first echo-request arrived at the second computer;
e.) sending a first echo reply from the second computer to the first computer in response to the first echo request;
f.) storing in the second computer a third time stamp $T_3$ representing the time when the first echo-reply left the second computer;
g.) receiving the first echo-reply at the first computer;
h.) storing in the first computer a fourth time stamp $T_4$ representing the time when the first echo-reply arrived at the first computer;
i.) including a pattern, under the ping -p[pattern] option, in a second echo-request ICMP packet from the second computer to the first computer, wherein the pattern comprises the second and third time stamps $T_2$ and $T_3$ and global positioning system (GPS) coordinates of the second computer;
j.) upon receipt of the second echo-request at the first computer, calculating with the first computer the clock offset between the first and second computers based on the four time stamps $T_1$, $T_2$, $T_3$, and $T_4$; and
k.) synchronizing the clocks of the first and second computers.

* * * * *